United States Patent
Farn

(10) Patent No.: US 10,114,620 B2
(45) Date of Patent: Oct. 30, 2018

(54) MANAGER SUPERCLASS METHOD FOR DISPLAYING A COMPONENT IN DIFFERENT SEGMENTS OF A WEB PAGE

(75) Inventor: Brian Gin Farn, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1623 days.

(21) Appl. No.: 11/217,057

(22) Filed: Aug. 31, 2005

(65) Prior Publication Data

US 2007/0074124 A1 Mar. 29, 2007

(51) Int. Cl.
| | | |
|---|---|---|
| G06F 9/44 | (2018.01) | |
| G06F 17/30 | (2006.01) | |
| G06F 9/451 | (2018.01) | |
| G06F 8/38 | (2018.01) | |
| G06F 9/448 | (2018.01) | |

(52) U.S. Cl.
CPC .......... *G06F 8/38* (2013.01); *G06F 17/30911* (2013.01); *G06F 9/4492* (2018.02); *G06F 9/451* (2018.02); *G06F 17/30896* (2013.01)

(58) Field of Classification Search
CPC ........ G06F 8/38; G06F 9/4428–9/4435; G06F 8/00; G06F 8/20; G06F 8/30; G06F 8/31; G06F 8/315; G06F 9/54; G06F 9/541; G06F 9/547; G06F 17/30861; G06F 17/3089; G06F 17/30896; G06F 17/30911
USPC .......................................... 717/109; 715/760
See application file for complete search history.

(56) References Cited

U.S. PATENT DOCUMENTS

| | | | |
|---|---|---|---|
| 5,490,258 A * | 2/1996 | Fenner ................... | 707/999.001 |
| 5,787,432 A * | 7/1998 | LeTourneau ................... | 707/741 |
| 6,880,129 B1 * | 4/2005 | Lee et al. ....................... | 715/763 |
| 8,418,131 B2 * | 4/2013 | Emmelmann ........... | G06F 8/315 |
| | | | 709/217 |
| 2003/0005166 A1 | 1/2003 | Seidman | |
| 2003/0074634 A1* | 4/2003 | Emmelmann ........... | G06F 8/315 |
| | | | 715/255 |

(Continued)

OTHER PUBLICATIONS

Microsoft Corporation. "Microsoft Computer Dictionary, Fifth Edition." 2002, Microsoft Press. p. 341.*

(Continued)

*Primary Examiner* — Todd Aguilera
*Assistant Examiner* — Erika Kretzmer
(74) *Attorney, Agent, or Firm* — Steven M. Greenberg, Esq.; CRGO Law

(57) ABSTRACT

Different segments of a web page may display multiple values from different fields from a managed component. In dynamic web pages, processing is done in top down order. A web page may have multiple segments. The method uses hidden fields in the web page and a new manager superclass. The manager superclass is extended by a managed component. The managed component is displayed in multiple segments of a web page. The manager superclass provides a segment entry method, a segment exit method, and a component entry method to the managed component. The manger superclass provides getter and setter methods for properties of the visual component. An index is assigned to each segment in the web page. The manager superclass defines a segment index method that allows the managed component to query which of the segments in the web page is active when a getter or setter method is invoked.

12 Claims, 8 Drawing Sheets

(56) References Cited

U.S. PATENT DOCUMENTS

2006/0004913 A1* 1/2006 Chong ............... G06F 17/3089
709/217
2006/0248442 A1* 11/2006 Rosenstein et al. ....... 715/501.1

OTHER PUBLICATIONS

Abdelnur, A and S Hepper. "Java™ Portlet Specification" Oct. 7, 2003. Version 1.0. Sun Microsystems, Inc., pp. 13-17, 19, 20, 52-53, and 65.*

Abdelnur, A and S Hepper. "Java™ Portlet Specification" Oct. 7, 2003. Version 1.0. Sun Microsystems, Inc., pp. 13-17, 19, 20, 46, 52-53, 55 and 65.*

Pingali, Gopal et al., Steerable Interfaces for Pervasive Computing Spaces, www.cs.princeton.edu/-chenhan/papers/percom2003.pdf, USA.

Parlante, Nick, Servlets, Handout #32, www.stanford.edu/class/cs193i/handouts2000/32Servlets.pdf, Spring 1999, USA.

* cited by examiner

```
100
<!DOCTYPE HTML PUBLIC "-//W3C//DTD HTML 4.01 Transitional//EN">
<%@taglib uri="http://java.sun.com/jsf/core" prefix="f"%>       125
<%@taglib uri="http://java.sun.com/jsf/html" prefix="h"%>       130
<HEAD>
</HEAD>
<f:view>                                                         135
        <h:form id="myForm">                                     140
                <h:panelGrid width="10" columns="1" title="Panel Grid"
cellpadding="0" cellspacing="0" border="0" >
                        <f:subview id="subviewOne" >             110
                                <jsp:include page="Segment.jsp />  145
                        </f:subview>
                        <f:subview id="subviewTwo" >             115
                                <jsp:include page="Segment.jsp" /> 145
                        </f:subview>
                        <f:subview id="subviewThree" >           120
                                <jsp:include page="Segment.jsp" /> 145
                        </f:subview>
                        <h:commandButton id="button1" type="submit"
value="Submit" action="browse" />
                </h:panelGrid>
        </h:form>
</f:view>
```

Figure 1A - Code for JAVAServer Page
(Prior Art)

```
<%@taglib uri="http://java.sun.com/jsf/html" prefix="h"%>
<h:panelGrid columns="3" cellpadding="0" cellspacing="0" border="0"
style="vertical-align: bottom;" >
        <h:inputText value="#{SegmentSample.name}" style="width: 100px" />
        <h:inputText value="#{SegmentSample.userID}" style="width: 200px" />
        <h:inputText value="#{SegmentSample.password}" style="width: 100px" />
</h:panelGrid>
```

Figure 1B - Code for Segment.jsp
(Prior Art)

```
<faces-config>
        <managed-bean>
                <managed-bean-name>SegmentSample</managed-bean-name>
                <managed-bean-class>codebehind.SegmentSampleClass </managed-bean-class>
                <managed-bean-scope>session</managed-bean-scope>
        </managed-bean>
</faces-config>
```

Figure 1C - Code for SegmentSample
(Prior Art)

```
package codebehind;
    public class SegmentSampleClass {
        protected String[] names      = { "name1",     "name2",     "name3" };
        protected String[] userIDs    = { "userid1",   "userid2",   "userid3" };
        protected String[] passwords  = { "password1", "password2", "password3" };
        protected int _segmentIndex = 0;
        /**
        * Obtains the name property at the segment index
        */
        public String getName(){
            return names[ _segmentIndex ];
        }
        /**
        * Sets the name property at the segment index to the specified value
        */
        public void setName( String newName ){
            names[ _segmentIndex ] = newName;
        }
        /**
        * Obtains the userID property at the segment index
        */
        public String getUserID(){
            return userIDs[ _segmentIndex ];
        }
        /**
        * Sets the userID at the segment index to the specified value
        */
        public void setUserID( String newUserID ){
            userIDs[ _segmentIndex ] = newUserID;
        }
        /**
        * Obtains the password property at the segment index
        */
        public String getPassword() {
            return passwords[ _segmentIndex ];
        }
        /**
        * Sets the password at the segment index to the specified value
        *
        /public void setPassword( String newPassword ) {
            password[ _segmentIndex ] = newPassword;
        }
    }
```

Figure 2A - Code for managed JAVABean
(Prior Art)

| name 1 | userid 1 | password 1 |
|--------|----------|------------|
| name 1 | userid 1 | password 1 |
| name 1 | userid 1 | password 1 |

Figure 2B - Display of Prior Art

```
package codebehind;
import javax.faces.component.html.HtmlInputText ;
public abstract class SegmentManager {                              410
        protected static final String INIT = "INIT";                420
        protected static final String GET = "GET";                  422
        protected static final String SET = "SET";                  424
        protected String _mode = INIT;                              426
        protected int _segmentIndex = 0;                            428
        /**
        * Returns the index number of the active segment. Subclasses call this method to obtain the
index of the active segment during a property get or set invocation.
        */
        protected int getSegmentIndex(){                            430
                return _segmentIndex;
        }
        /**
        * If the mode is currently not GET, then the mode is set to GET and the segment index is set to
zero.
        */
        public String getSegmentEntry(){                            432
                if( _mode != GET ){
                        _mode = GET;
                        _segmentIndex = 0;
                }
                return "entry";
        }
        /**
        * If the mode is currently not SET, then the mode is set to SET and the segment index is set to
zero.
        */
        public void setSegmentEntry( String str ){                  434
                if( _mode != SET ){
                        _mode = SET;
                        _segmentIndex = 0;
                }
        }
        /**
        * The segment index is incremented by one.
        */
        public String getSegmentExit(){                             436
                _segmentIndex++;
                return "exit";
        }
        /**
        * The segment index is incremented by one.
        */
        public void setSegmentExit( String str ){                   438
                _segmentIndex++;
        }
```

Figure 4 - Code for SegmentManager superclass

```
/**
 * Creates and returns a new HtmlInputText JSF component corresponding to an h:inputHidden
field.
 */
public HtmlInputText getComponentEntry (){                      440
        return new HtmlInputText();
}
/**
 * Sets the segment index to zero.
 */
public void setComponentEntry( HtmlInputText input ){           442
        __segmentIndex = 0;
}
}
```

Figure 4 (continued) - Code for SegmentManager superclass

```
package codebehind;
    public class SegmentSampleClass extends SegmentManager {          510
        protected String[] names     = { "name1",      "name2",      "name3" };
        protected String[] userIDs   = { "userid1",    "userid2",    "userid3" };
        protected String[] passwords = { "password1",  "password2",  "password3" };
        /**
         * Obtains the name property at the segment index
         */
        public String getName(){
                return names[ getSegmentIndex() ];
        }
        /**
         * Sets the name at the segment index to the specified value
         */
        public void setName( String newName ){
                names[ getSegmentIndex() ] = newName;
        }
        /**
         * Obtains the userID property at the segment index
         */
        public String getUserID(){
                return userIDs[ getSegmentIndex() ];
        }
        /**
         * Sets the userID at the segment index to the specified value
         */
        public void setUserID( String newUserID ){
                userIDs[ getSegmentIndex() ] = newUserID;
        }
        /**
         * Obtains the password property at the segment index
         */
        public String getPassword() {
                return passwords[ getSegmentIndex() ];
        }
        /**
         * Sets the password at the segment index to the specified value
         */
        public void setPassword( String newPassword ) {
                password[ getSegmentIndex() ] = newPassword;
        }
    }
```

Figure 5
SegmentSample subclass

```
<%@taglib uri="http://java.sun.com/jsp/html" prefix="h"%>
<h:inputHidden value="#{SegmentSample.segmentEntry}"              610
     binding="#{SegmentSample.componentEntry}" />                 620
<h:panelGrid columns="4" cellpadding="0" cellspacing="0" border="0"
     style="vertical-align: bottom;" >
        <h:inputText   value="#{SegmentSample.name}"     style="width: 100px" />
        <h:inputText   value="#{SegmentSample.userID}"   style="width: 200px" />
        <h:inputText   value="#{SegmentSample.password}" style="width: 100px" />
</h:panelGrid>
<h:inputHidden value="#{SegmentSample.segmentExit}" />            650
```

Figure 6
HiddenInputComponent

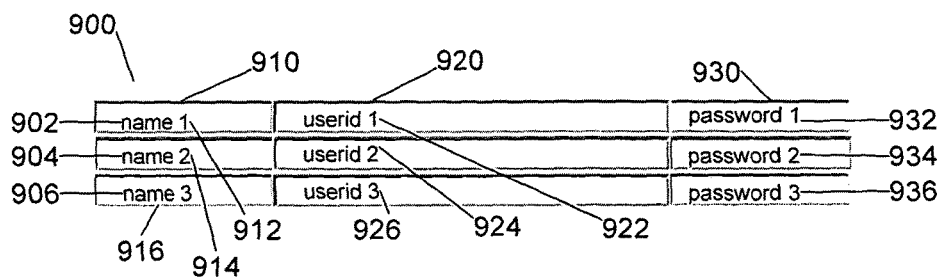

Figure 9

MANAGER SUPERCLASS METHOD FOR DISPLAYING A COMPONENT IN DIFFERENT SEGMENTS OF A WEB PAGE

FIELD OF THE INVENTION

This invention relates generally to the field of computer programming and more particularly relates to graphically displaying multiple instances of fields having different values for use in networked computer applications.

BACKGROUND OF THE INVENTION

Distributed computing has become the standard paradigm of computing characterized by a number of computers, called clients and servers, interconnected through a network wherein the logic and the software applications used by one client or server resides on another server. A server computer may provide the application software, the logic, and sometimes even the databases for a number of other servers and clients. The explosive growth of access to the Internet, moreover, has farther contributed to the modern computing paradigm such that in today's computing environment, the network connecting clients and servers is the world wide web. Hypertext transfer protocol (HTTP) is a network protocol of the world wide web (the Web), and Java® is a programming language developed by Sun Microsystems that blossomed and thrived in the mid to late 1990s coincident with the burgeoning expansion of network computer technology and the browser/HTTP technology on the Internet and Intranets in part because Java is independent of the operating system of a computer. Java applications can be written on one computer and transferred over a network, such as the Internet, to any processing device having a Java virtual machine regardless of the hardware or software in the receiving machine, consistent with the Write Once, Run Anywhere philosophy of Java software development. Thus, Java applications can be written on one server and then transferred over the web to multiple clients/servers.

A tutorial of definitions as used in the paradigm of networked computing may be helpful. An application or a client program is a software program used by an end user. For instance, a person entering data to schedule employees' workdays may be using a scheduling client program or application. A person writing a paper may be using a word processing application. A person creating a visual demonstration may be using a presentation application. A tool is a software application environment that enables a software developer to write further applications in a particular computer environment. IBM's VisualAge, Visual J++, Lotus Bean Machine, Semantic Café, etc. are all tools that allow a programmer to write Java applications. A component is software code that can be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. Thus, a software developer using tools to write an application can pull a calendar component of the server for insertion into the application.

A JavaBean is a particular kind of component that can be visually manipulated in a tool and meets a standard protocol of Sun Microsystems for the Java programming language. JavaBeans are intended to be relatively coarse-grained business objects such as a generic purchase order or an employee record or a calendar. A JavaBean is defined by two interfaces: (1) the public or home interface containing methods to either create or remove JavaBeans and, in the case of persistent JavaBeans (Entity Beans), to find and instantiate a JavaBean; and (2) the remote interface or JavaBean object which defines the business methods of a JavaBean that can be accessed by a client program. Any interface of a JavaBean is defined by three aspects: (1) attributes; (2) events; and (3) methods. An attribute is supported by public getter and/or setter methods and may be of three kinds: simple; boolean; or indexed, each of which may be bound or constrained. For example, a simple attribute in a spreadsheet tool would be the balance of an account. An example of an indexed attribute in the spreadsheet tool would be the owners of an account, if there were more than one owner. An example of a boolean attribute would be if the balance of the account were greater or less than a particular amount such that a response would be true or false. A bound attribute tells its dependent attributes that it has changed when/after it changes. A constrained attribute notifies its dependent attributes before it changes and the listeners of that constrained attribute have the option to veto the change, called an exception. An example of a bound attribute would be the balance of a bank account. An example of a constrained attribute would be change of ownership of the account. A session object is a JavaBean object that executes on behalf of a single client, can be aware of transactions, can update shared data in an underlying database, but does not represent directly shared data in the database and is relatively short-lived. An entity object provides an object view of data in the database, allows shared access of data in the database from multiple users, and can be long-lived. JavaBeans are distributed across a computer network through a Java Archive (JAR) which is basically a zip file with a manifest file.

Servlets are programs that run on a Web server, acting as a middle layer between a request coming from a Web browser or other HTTP client and databases or applications on the HTTP server. Servlets allow one computer/application to read any data, usually entered in a form on a Web page but which could also come from a Java applet or a custom HTTP client program, across a network. Servlets have a myriad of capabilities, they can look up information, such as details about browser capabilities, cookies, the host name of the requesting client, etc., embedded in a HTTP request; servlets can generate a response to a request by, e.g., talking to a database, executing a remote method invocation or a common object request broker architecture (CORBA), invoking an application, or computing a response directly. In any event, the servlet formats the results and embeds them in an HTML page. A servlet may set appropriate HTTP response parameters by telling a Web browser what type of document is being returned, e.g., HTML, setting cookies and caching parameters, etc. Finally, a servlet can send the document back to the client in text format such as HTML, binary format such as GIF images, or even in a compressed format.

Some client requests can be satisfied by returning the static and/or pre-built documents, and these requests would be handled by the server without invoking servlets. Increasingly so, however, a new Web page needs to be generated for each request. There are a number of reasons why Web pages need to be built "on-the-fly." The Web page may be based on data submitted by the user such as an on-line shopping cart, or the Web page may be derived from data that changes frequently, such as a news and/or weather. Another cause for dynamically changing Web pages is that an e-commerce site could use a servlet to build a Web page that lists the current price and availability of each item for sale. For example, the initial page at most on-line stores is the same for all visitors, except for a small welcome message giving the visitor's name if it is known.

JavaServer Pages (JSP) refers to Java's implementation that allows a programmer or web developer to mix static (unchanging) HTML features of a web page with dynamically generated content from servlets. JSP allows a programmer to create the two parts of a web page separately such that most of the page may consist of regular HTML passed to the visitor unchanged. Parts that are dynamically generated are marked with special HTML-like tags and mixed into the page.

Web pages programmed in Java on the Internet may contain a list of items each described by a set of visual components, i.e., JavaBeans. A Web page, for example, may display a list of items for purchase, a set of visual components such as a label describing the item, an image depicting the item, perhaps another label for the cost of the item, and a checkbox for a customer to select the item for purchase. JavaServer Pages (also referred to as JSPs) have the capacity to allow a main JSP web page to include one or more other JSPs. These included JavaServer pages are called JSP segments; in the example given above, each item's set of visual components may be grouped together and moved to a JSP segment file. The main JavaServer web page would then include the JSP segment file multiple times, once for each item. Prior to the JavaServer Pages 2.0 specification, JSP segments were called JSP fragments.

The JSP segment may further contain a JavaServer Faces (JSF) visual component. JavaServer Faces technology enables a web developer to build user interfaces for JavaServer applications that assemble reusable user interface components in a page, connect these components to an application data source, and connect client-generated events to server-side event handlers, thus managing the user interfaces on the server, allowing the application developer to focus on application code. JavaServer Faces technology has application program interfaces (APIs) to represent user interface components and manage their state, handle events, validate input, define page navigation, and support internationalization and accessibility. Thus, the JSP segment as described above may further contain a JavaServer Faces visual component bound to a managed JavaBean (or simply bean) having methods for getting and setting the value of the property.

A main JavaServer Page may include a JSP segment multiple times. JavaServer Faces technology and specification dictate that each segment must be contained within a JavaServer Faces subview component. The code 100 shown in the prior art of FIG. 1a of a JavaServer Page includes three instances of a JSP segment: AsubviewOne 110; AsubviewTwo 115; and AsubviewThree 120. Tag libraries contain the code for a set of JavaServer Faces tags, and in a JSP, the Ataglib directive declares the name of a tag library. When a prefix is specified, such as in Ah:inputText, the prefix denotes in which tag library the tag, in this case AinputText is located. One tag library has the universal resource identifier (uri) of Ahttp://Java.sun.com/jsf/core and refers to a core library having a prefix f, in this case, <f:view>135. A core is a JavaServer Faces tag specific to a JavaServer Face component. Another tag library has an uri of Ahttp://Java.sun.com/jsf/html 130 and refers to a JavaServer Faces tag specific to hypertext markup language (html) tag with a prefix h, shown above as <h:form>140. The actual grouping of the user interface components are within a JavaServer Page segment. The code <jsp:include page=segmentjsp/>145 refers to the contained JSP segment in the file named "Segmentjsp" and describes a panel with three input fields: a customer's name; an identifier; and a password. The value of each input field is bound to a property of a JavaServer Faces managed bean named "SegmentSample". Shown in FIG. 1b is the code of ASegmentjsp and this code is processed three times each time the JavaServer Faces components <f:view> and <h:form> are encountered. Shown in FIG. 1c is the JavaServer Faces managed bean named "SegmentSample" that is declared in the faces-config.xml file of the JavaServer Faces application. The managed bean is implemented by a managed bean class named "codebehind.SegmentSampleClass" that contains getter and setter methods for the properties "name", "userID", and "password"; the managed bean class itself is shown in FIG. 2a.

In the prior art code above, because the main JavaServer Page includes the same JSP segment file multiple times, each JavaServer Faces component instance is bound to the same managed bean property. The property getter and setter methods of the managed bean, however, do not know which segment instance is active when the method is invoked, and as a result, the same property value is displayed in every JSP segment. Because of the shortcomings of the prior art described above, in the SegmentSampleClass class, the index named "_segmentIndex" never changes from its initial state of zero resulting in a web browser display shown in FIG. 2b. There are no known solutions to this problem.

There is thus a need for programmers to have the concept of a record type, where each record type contains a set of fields, each field having characteristics, e.g., length in characters, type such as numeric, and attributes such as protected and highlighted. Multiple instances of records of a single record type can be displayed simultaneously on a 5250 character based display terminal, each with its own data. In converting records and record types to JavaServer Pages/Faces technologies, a record type can be represented by a JavaServer Page segment and each field within the record type can be represented by a JavaServer Faces visual component. Each component can be value bound to properties in a backing bean and a web page may include multiple inclusions of a single record JavaServer Page segment, but no mechanism exists for the determination of which record segment instance is active when a property accessor of the managed bean is invoked by the JavaServer Page/JavaServer Faces runtime.

SUMMARY OF THE INVENTION

The invention may thus be described as a method, an apparatus, and a service to display multiple instances of at least one field on a web page wherein each instance of the field may have a different value, the method comprising the steps of: requesting a web page; initializing a mode and setting a current index of the instance of at least one user interface component to a starting value. These steps may be processed by a superclass. The steps may further involve a subclass initializing values of the multiple instances. At least one user interface component is created and the mode is changed to GET, preferably performed by the superclass. The subclass then obtains the current index and the fields and values for that index. The current index is incremented by the superclass and if there are further instances, the subclass obtains the current index for the each of the indices and then gets the field and the associated value for the current index, one index at a time. If there are no more instances, the web page is submitted.

The method, service contract, and apparatus may further comprise receiving the submitted web page; changing the index of the instance to the starting value; getting the current index; getting the at least one field and the entered associated value for the instance pertaining to the current index; and incrementing the current index. If there is another instance, the method, service contract, and apparatus may further comprise getting the current index; getting the at least one field and the entered associated value for the current index; and incrementing the current index until there are no more instances.

Then, mode is changed to SET and the current index is set to the starting value, preferably by the superclass. The current index is obtained and the at least one field and the entered associated value for the current index are set, preferably by the subclass. The current index is incremented until there are no more instances.

The at least one field and the associated values for all of the instances may comprise dynamically generated content from a JavaServer Page or an Active X web page. The user interface component may be a JavaServer Face.

The invention may also be considered a method to display multiple instances of at least one field on a web page for display over a computer network, wherein each instance of the field may have a different value, the method comprising the steps of: a superclass initializing a mode and setting an index of the instance to a starting value as a current index; a subclass initializing values of the multiple instances; the superclass creating at least one user interface component associated with the at least one field; the superclass changing the mode to GET; the subclass getting the current index; the subclass getting the at least one field and the associated value, the fields and values being dynamically generated content; the superclass incrementing the current index; and if there is another instance, then the subclass getting the current index and the at least one field and the associated value for the current index. The superclass then increments the index and the subclass get the index and the values for that index until there are no more instances. After the web page has been submitted, the superclass changes the mode to SET and sets the current index to the starting value; the subclass gets the current index and sets the at least one field and the entered associated value for the current index; the superclass increments the current index until there are not more instances.

The invention may simply be considered a method to create and maintain a web page across a computer network, comprising the steps of requesting a web page; calling a superclass to manage a plurality of instances of data on the web page; creating user interface components for the fields and values of the plurality of instances; determining a mode of operation, creating and then incrementing an index for each instance; and for each instance, calling a subclass to perform an action of the mode. The modes may comprise an initialize mode to initialize the index, the fields, and values; a get mode to obtain the index and the fields and values associated with that index; and a set mode to store the index and the fields and values associated with that index.

The invention is also a computer program product comprising a computer usable medium having computer usable program code, wherein when the computer usable program code is loadable into the internal memory of a processing device, causes the processing device to download a web page across a network; present a plurality of user interface components on the web page for entry of data, there being multiple properties and multiple instances of the data; calling a manager class having a method that allows the plurality of components to query which instance is active when a property method is invoked, the manager class having at least three modes during which the method is called.

Another presentation of the invention is a service contract for managing data transfer transactions between at least one microprocessor device and a servlet, both coupled to a communication network, the at least one microprocessor device having processing hardware and/or software, the service contract comprising: presenting a web page having a plurality of user interface components into which data can be entered, the data having a number of properties, a number of values, and a number of instances; providing a superclass accessible to the plurality of components to query which instance of which property is active; providing a subclass to get and set and then redisplay the data, such that the properties may have different values for one or more of the instances. Preferably the subclass is written in a dynamic scripting language; the user interface components are visual components.

BRIEF DESCRIPTION OF THE DRAWING

FIGS. 1a-1c are examples of prior art Java code for a Java server page, a JSP segment, and a declaration of a managed JavaBean, respectively;

FIG. 2a is an example of prior art Java code for a managed JavaBean and FIG. 2b is a graphical display of the result when features of the invention are not used;

FIG. 4 is an example of object oriented programming code of a new SegmentManager class in accordance with an embodiment of the invention;

FIG. 5 is an example of object-oriented programming code of a SegmentSample subclass that can be used with the SegmentManager class in accordance with an embodiment of the invention;

FIG. 6 is an example of code with a hidden input component that can be used with the SegmentManager class in accordance with an embodiment of the invention;

FIG. 9 is a graphical display of the result when the class to display multiple instances on a web page in accordance with features of the invention is used.

DETAILED DESCRIPTION OF THE INVENTION

Figure 3:
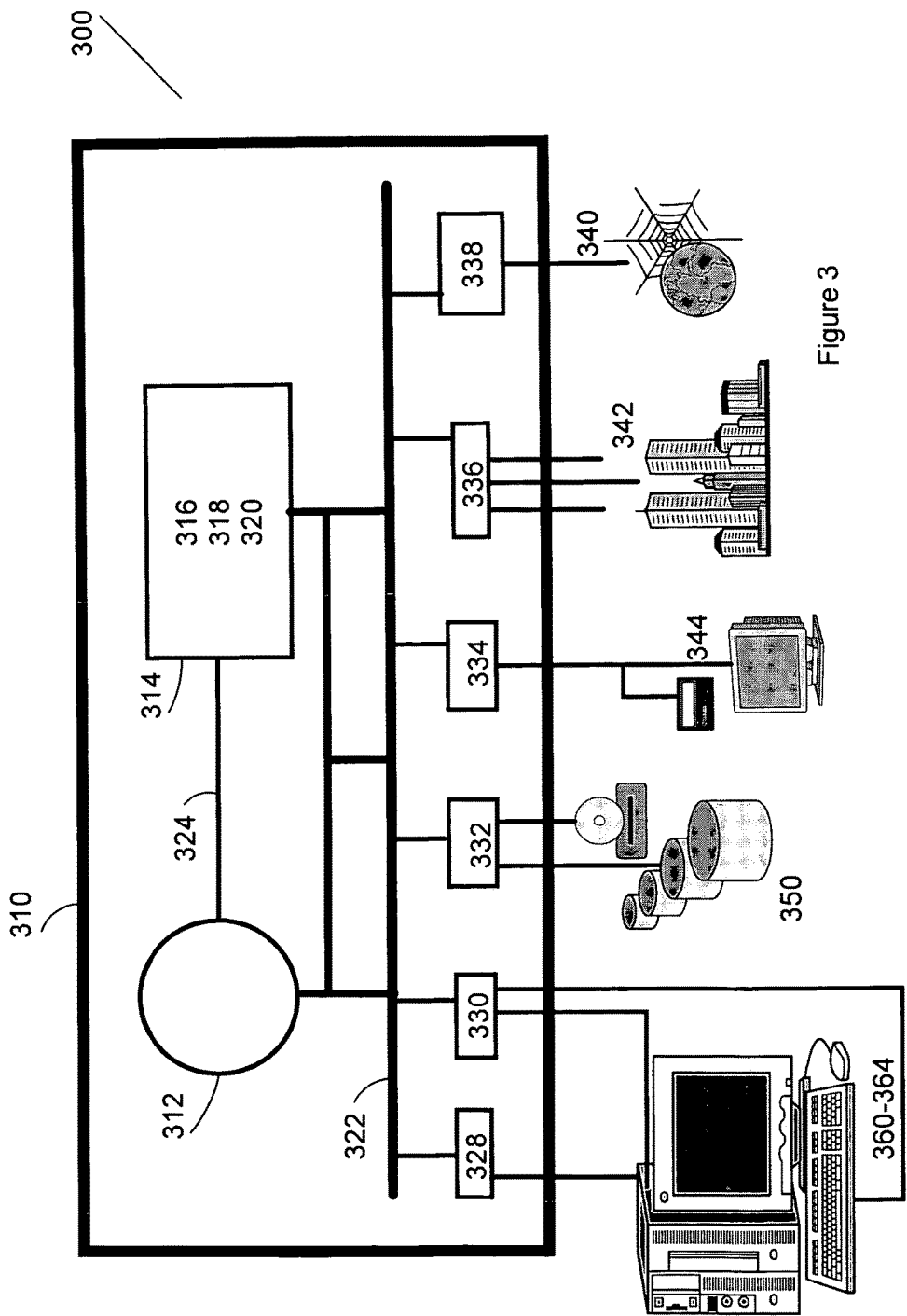
FIG. 3 is a simplified block diagram of a computer network and a computer upon embodiment of the invention can be implemented.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code for carrying out operations of the present invention may be written in an object oriented programming language such as Java7, Smalltalk or C++. However, the computer program source code for carrying out operations of the present invention may also be written in conventional procedural programming languages, such as the C programming language. The program object code may execute entirely on the software developer's computer, partly on the software developer's computer, as a stand-alone software package, partly on the software developer=s computer and partly on a remote computer or entirely on the remote computer. In the latter scenario, the remote computer may be connected to the software developer=s computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 3, a high-level block diagram of a computer network system 300 consistent with an embodiment of the invention is shown. Computer network system 300 may comprise any number of networked computers 310, each of which may have a central processing unit (CPU) 312, main memory 314, and various digital and/or analog interfaces 328-338. The various devices communicate with each other via an internal communications bus 322. CPU 312 is a general-purpose programmable processor, executing instructions stored in memory 314; while a single CPU is shown in FIG. 3, it should be understood that computer systems having multiple CPUs could be used. Communications bus 322 supports transfer of data, commands and other information between different devices, and while shown in simplified form as a single bus, it is typically structured as multiple buses including an internal bus 324 which may connect the CPU 312 directly with memory 314.

Memory 314 is a random-access semiconductor memory for storing data and programs; memory 314 is shown conceptually as a single monolithic entity but it is well known that memory is often arranged in a hierarchy of caches and other memory devices, some or all of which may be integrated into the same semiconductor substrate as the CPU 312. Random access memory (RAM) devices comprising the main storage of computer, as well as any supplemental levels of memory, e.g., cache memories, nonvolatile or backup memories, programmable or flash memories, read-only memories, etc. In addition, memory 314 may be considered to include memory storage physically located elsewhere in computer, e.g., a cache memory in a processor or other storage capacity used as a virtual memory, e.g., as stored on a mass storage device or on another computer coupled to computer via network.

Operating system 316 and applications 318,320 reside in memory 314. Operating system 316 provides, inter alia, functions such as device interfaces, management of memory pages, management of multiple tasks, etc. as is known in the art. Examples of such operating systems may include Linux, Aix, Unix, Windows-based, OS/400, an Rtos, a handheld operating system, etc. On iSeries and AS/400 machines, OS/400 is the native operating system and object system and IFS is the Unix object system complemented by the Qshell Unix command shell. These and other various applications, components, programs, objects, modules, etc. may also execute on one or more processors in another computer coupled to computer 310 via a network 340, 342, e.g., in a distributed or client-server computing environment, whereby the processing required to implement the functions of a computer program may be allocated to multiple computers 310 over a network 340, 342.

The invention is equally applicable to any microprocessor device having an operating system in which the microprocessor or processing device is connected across a network to devices having the same or different operating systems. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 318, 320 may include a source container as described herein as part of or callable from an integrated development environment, and if a server software application is included, network interface 336, 338 may interact with the server software application to enable computer system 310 to be a network server.

It should be appreciated that computer 310 typically includes suitable analog and/or digital interfaces 328-338 between CPU 312 and the attached components as is known in the art. For instance, computer 310 typically receives a number of inputs and outputs for communicating information externally. For interface with a software developer or operator, computer 310 typically includes one or more software developer input devices 360-364, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 310, e.g., some server implementations, might not support direct software developer input and output. Terminal interface 334 may support the attachment of single or multiple terminals 344 and may be implemented as one or multiple electronic circuit cards or other units. Data storage 350 preferably comprises one or more rotating magnetic hard disk drive units, although other types of data storage, including a tape or optical driver, could be used. For additional storage, computer 310 may also include one or more mass storage devices 350, e.g., a floppy or other removable disk drive, a hard disk drive, a direct access storage device (DASD), an optical drive e.g., a compact disk (CD) drive, a digital video disk (DVD) drive, etc., and/or a tape drive, among others. One of skill in the art will further anticipate that the interfaces 328-338 may also be wireless.

Furthermore, computer 310 may include an interface 336, 338 with one or more networks 340, 342 to permit the communication of information with other computers 310 coupled to the network(s) 340, 342. Network interface(s) 336, 338 provides a physical and/or wireless connection for transmission of data to and from a network(s) 340,342. Network(s) 340,342 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 300 may be connected to more than one network 340,342 simultaneously. Computer system and remote systems 310 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 340, 342.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROMs, DVDs, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

The following detailed description of the embodiments of the present invention does not limit the implementation of the invention to any particular computer programming language. The present invention may be implemented in any computer programming language provided that the operating system provides the facilities that may support the requirements of the present invention. A preferred embodiment is implemented in the C or C++ computer programming language, Java, or other computer programming languages in conjunction with C/C++. Any limitations presented would be a result of a particular type of operating system, computer programming language, or data processing system and would not be a limitation of the present invention. While the illustrated embodiment is in Java and is implemented with JavaServer Page/Faces technology, the principles herein and the programming are equally applicable to other object-oriented computer languages and other dynamic scripting languages, such as Active Server Pages and Hypertext Preprocessor (PHP). Further the invention is not limited to visual components and HTML, but may be implemented in XML and other components compatible and used by XML.

The inventor herein took advantage of the fact that in dynamic web pages, processing is done in top down order. By assigning a zero based index to each segment inclusion, where the topmost inclusion has an index value of zero, a segment is reset each time. The inventive method and apparatus herein uses hidden fields and a new "manager" class. The Amanager class is preferably included with a servlet. Each programmer's managed visual component needs to subclass the manager class.

The manager class contains a method that allows the programmer's managed visual component, such as a bean, to query which segment is active when a property getter or setter method is invoked. The inventor further created a new class called "SegmentManager that deduces what segment inclusion is active by managing a segment index. An example of object-oriented code 400 for a SegmentManager class is shown in FIG. 4. In this class 410, subclasses are able to determine what inclusion is active during the invocation of a subclass' property getter or setter method. The class has getter and setter methods for the following properties: (a) segmentEntry; (b) segmentExit; and (c) componentEntry. The new class also manages a mode state having three values: INIT 420 which indicates that the mode is in initialization state; GET 422 that indicates that the mode is in property get state; and SET 424 that indicates that the mode is in property set state. The class contains two state variables: (1) mode indicating the current mode state; and (2) segmentIndex indicating the active segment inclusion. It is suggested that the initial value of the _mode state variable is INIT as in 426 and the initial value of the _segmentIndex state variable is zero as in 428, although these initial variables and values need not be so limited.

The class has the following methods: getSegmentIndex 430 which returns the current value of the segment index; getSegmentEntry 432 which sets the mode to GET and sets the segment index to zero; setSegmentEntry 434 which sets the mode to SET and also sets the segment index to zero. The segment index is incremented by one by the methods getSegmentExit 436 and setSegmentExit 438. The method getComponentEntry 440 returns a new visual component for the hidden field (h:inputHidden), preferably an an HtmlInputText JavaServer Faces component. The method setComponentEntry 442 sets the segment index to zero.

A managed bean must be able to subclass the superclass. In FIG. 5, code 500 for a managed bean named SegmentSampleClass 510 is modified to subclass the SegmentManager superclass. A method of the SegmentManager superclass, (see FIG. 4), the getSegmentIndex method 430 can now be used by the subclass to obtain the index of the active segment.

The components of a segment are surrounded with hidden input field (inputHidden) components. FIG. 6 is an example of code that can be used to create the hidden component. An inputHidden component 610 is placed at the beginning or entry of the segment to in order to track the start of a top to bottom traversal through the segment's components and again at the end or exit 650 of the segment to track the completion through the segment's components. The entry inputHidden component has a value binding to the segmentEntry property at line 610 and a component binding to the property named "componentEntry at line 620, both of the SegmentManager class. The component binding tracks the start of a top to bottom traversal through the web page's segments. The exit inputHidden component also has a value binding to the segmentExit property of the SegmentManager class at line 650.

Figure 7:
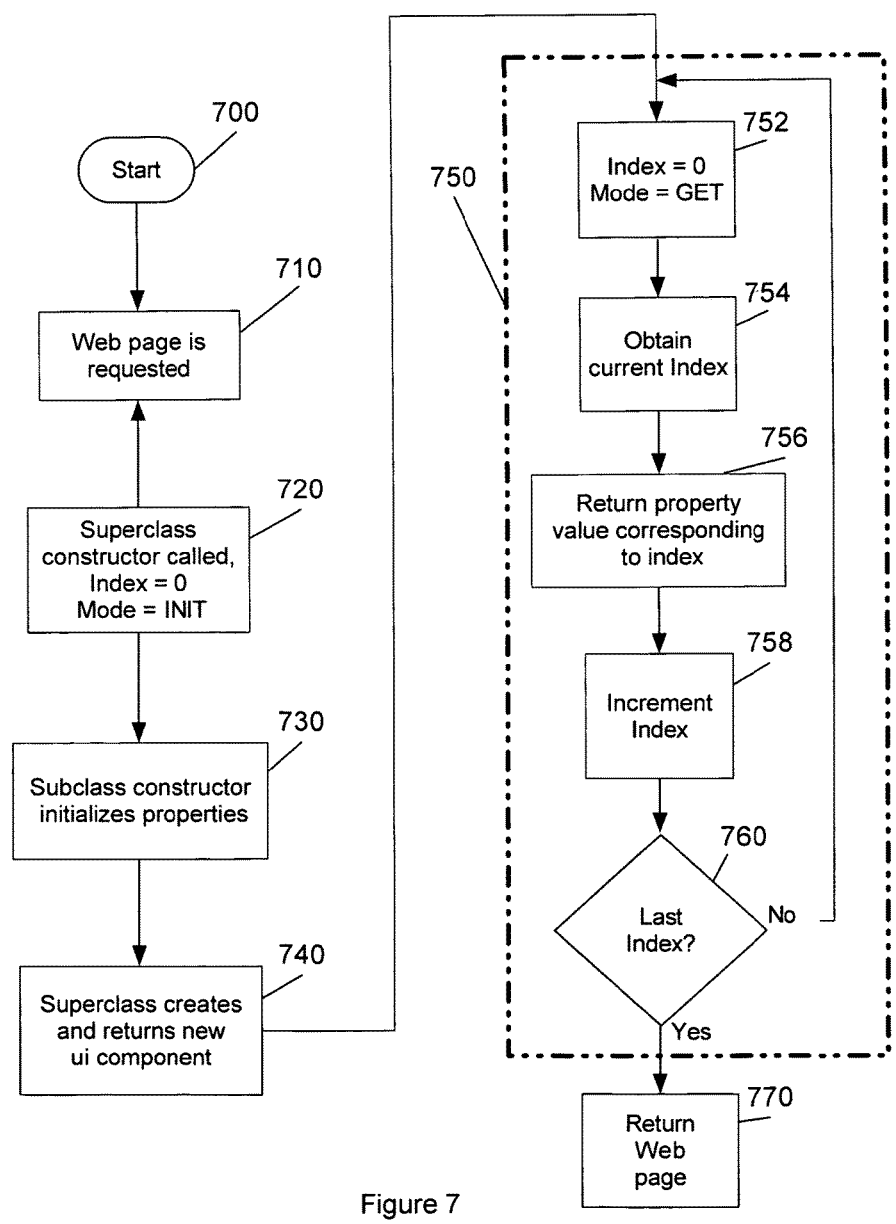
FIG. 7 is a simplified flow chart of how the class methods are processed when a web page is requested from an application servlet in accordance with features of the invention.

FIG. 7 is a simplified flow chart of the how the class methods are processed when the web page is requested 710. The web page may be requested from a remote or a local user or a program, such as a user or program on a rich client, a personal digital assistant, a telephone, a browser; basically any processing device that can provide an user interface to a web page. In block 720, the superclass, in this case SegmentManager, constructor is called and initializes an index and the mode. In block 730, the subclass, SegmentSample, constructor initializes the one or more properties that will be indexed. In block 740, the superclass creates and returns a new user interface component, i.e., in the example presented the SegmentManager=s getComponentEntry method processes this task. Then, in block 750 step 752, the superclass sets the index to zero and the mode to GET, if the mode is not already set to GET; in the code provide this step is processed by the SegmentManager=s getSegmentEntry method. In step 754 of block 750, the subclass gets the current index value from the superclass and in step 756, the subclass returns the property value corresponding to the index; processed in the example by the SegmentSample=s get method. In block 750 step 758, the superclass increments the index, as processed by the SegmentManager=s getSegmentExit method. Then in step 760, the superclass inquires if there is another index. If so, the process loops back up to step 752 of block 750. If there are no more indices, the process goes to step 770, to return the web page.

Figure 8:
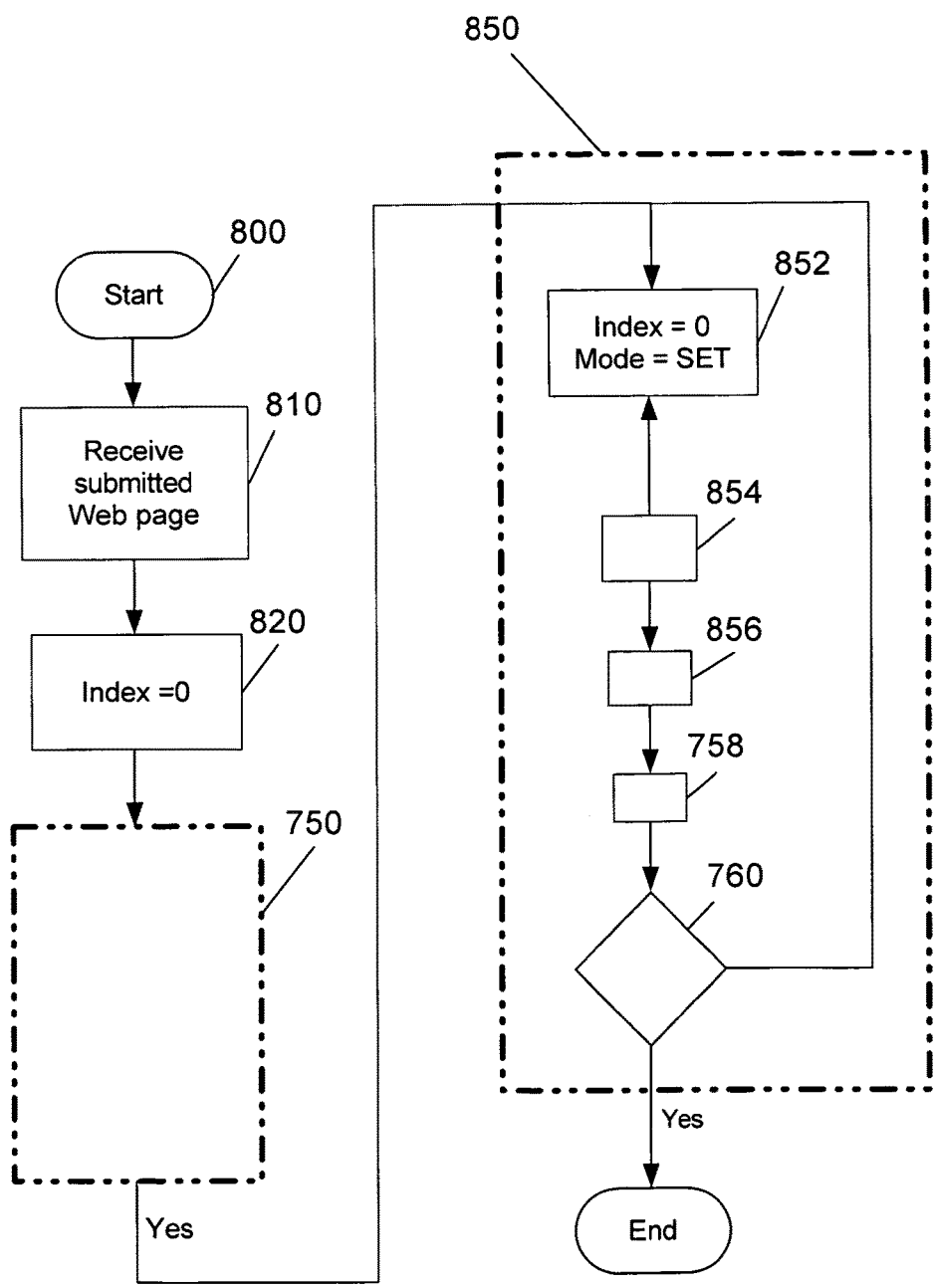
FIG. 8 is a is a simplified flow chart of how the class methods are processed when a web page is submitted to an application servlet in accordance with features of the invention.

The method steps processed after the user or an application program has entered values into the various input fields such as, in the example shown, different property values such as customers=names, userids and passwords have been entered, and then submits the web page, are shown in the simplified flow chart 800 of FIG. 8. In step 810, the web page is received. Then in step 820, the superclass sets the index to zero, as processed by the SegmentManager=s setComponentEntry method in the example given. Then, the processing occurs as in block 750 of FIG. 7 wherein the methods of the superclass and the subclass get the properties and their values. After all the properties and values corresponding to the several indices have been gotten, then the process goes into block 850, having steps 852, 854, 856, 758, and 760. Basically, the difference between block 850 and block 750 is that the mode is changed to SET, but the operations are similar. So in block 850, step 852, the superclass sets the index to zero and changes the mode to SET if the mode is not already SET, which in the example given is accomplished by SegmentManager-s setSegmentEntry method. The subclass, SegmentSample set method, obtains the current index from the superclass=s getSegmentIndex method, as in step 854. In step 856, the subclass=s set method sets the property value corresponding to the index; and then in step 758, the superclass increments the index, as processed by the SegmentManager=s getSegmentExit method. Then in step 760, the superclass inquires if there is another index. If so, the process loops back up to step 852 of block 850. If there are no more indices, the process ends. Thus, the property values are set to reflect data entered by the user.

As a result, the property values are displayed on the web page as illustrated in FIG. 9. While shown in FIG. 9 as visual components, one of skill in the art will realize that the principles herein can be applied equally to other user interface components that can be transmitted over a communications network, preferably using XML or a version thereof. Shown in FIG. 9 are three fields: name 910, userid 920, and password 930. Of course, the fields are not limited to this number or the labels or this particular format. Each of these fields have an instance: instance1 902, instance2 904, and instance3 906. Each field has a unique value in each instance, e.g., name1 912 may be the same or different than name2 914 which may be the same or different than name3 916, userid1 922 may be the same or different than userid2 924 which may be the same or different than userid3 926; password1 932 may be the same or different than password2 934 which may be the same or different than password3 936. In any event, the values of the fields are uniquely associated to the instances. Now, given the system, process, apparatus, and services provided herein, dynamic content having multiple instances may be transmitted and displayed on a web browser.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A web page display method comprising:
   receiving a requested Web page in a Web browser executing in memory by a processor of a computer, the Web page being defined by multiple different JavaServer Page (JSP) segments;
   referencing in the Web page a managed component in different ones of the JSP segments, the managed component sub-classing a manager class, the managed component inheriting methods from the manager class, the inherited methods selected from the group consisting of:

a segment entry method in which a mode of the managed component is set either to SET or GET and a corresponding segment index is set to zero, a segment exit method in which a mode of the managed component is set to GET and a corresponding segment index is incremented by one, and a component entry method in which a segment index is set to zero irrespective of a mode of managed component;

wherein the manager class defines a segment index method to query which of the JSP segments in the Web page is active at a time when a getter or setter method is invoked;

assigning a different index to each of the JSP segments in the Web page;

detecting invocation of a getter method of the managed component in the Web page; and, responsive to the detected invocation of the getter method, using the segment index method to determine which of the JSP segments is active when the getter method is invoked, identifying an index for the determined JSP segment, getting a value for a property using the identified index, incrementing the identified index, repeating the identifying, incrementing, and getting steps for each of the JSP segments, and then submitting the Web page.

2. The method of claim 1, further comprising:

receiving the submitted Web page;

setting a current index for a current JSP segment to a zero value;

selecting one of the properties of the managed component corresponding to the current index;

setting a property value of the selected property;

incrementing the current index; and, repeating the selecting, setting the respective property value, and incrementing for each of the JSP segments.

3. The method of claim 1, wherein the identified index is used to return respective values for multiple properties of the managed component.

4. The method of claim 2, wherein the identified index is used to set respective values for multiple properties of the managed component.

5. A web page display data processing system comprising: a computer with processor and memory; a Web browser executing in the memory by the processor of the computer; and, a manager executing by the Web browser, the manager comprising computer program instructions enabled to receive a requested Web page in a Web browser executing in memory by a processor of a computer, the Web page being defined by multiple different JavaServer Page (JSP) segments;

to referencing in the Web page a managed component in different ones of the JSP segments, the managed component sub-classing a manager class, the managed component inheriting methods from the manager class, the inherited methods selected from the group consisting of:

a segment entry method in which a mode of the managed component is set either to SET or GET and a corresponding segment index is set to zero, a segment exit method in which a mode of the managed component is set to GET and a corresponding segment index is incremented by one, and a component entry method in which a segment index is set to zero irrespective of a mode of managed component;

wherein the manager class defined a segment index method to query which of the JSP segments in the Web page is active at a time when a getter or setter method is invoked;

to assign a different index to each of the JSP segments in the Web page;

to detect invocation of a getter method of the managed component in the Web page;

and to respond to the detected invocation of the getter method by using the segment index method to determine which of the JSP segments is active when the getter method is invoked, identifying an index for the determined JSP segment, getting a value for a property using the identified index, incrementing the identified index, repeating the identifying, incrementing, and getting steps for each of the JSP segments, and then submitting the Web page.

6. The system of claim 5, wherein the manager is further enabled to:

receive the submitted Web page;

set a current index for a current JSP segment to a zero value;

select one of the properties of the managed component corresponding to the current index;

set a property value of the selected property;

increment the current index; and, repeat the selecting, setting the respective property value, and incrementing for each of the JSP segments.

7. The system of claim 5, wherein the identified index is used to return respective values for multiple properties of the managed component.

8. The system of claim 6, wherein the identified index is used to set respective values for multiple properties of the managed component.

9. A non-transitory computer usable storage memory device having stored thereon computer usable program code for Web page display, the computer usable program code comprising:

computer usable program code for receiving a requested Web page in a Web browser executing in memory by a processor of a computer, the Web page being defined by multiple different JavaServer Page (JSP) segments;

computer usable program code for referencing in the Web page a managed component in different ones of the JSP segments, the managed component sub-classing a manager class, the managed component inhering methods from the manager class, the inherited methods selected from the group consisting of:

a segment entry method in which a mode of the managed component is set either to SET or GET and a corresponding segment index is set to zero, a segment exit method in which a mode of the managed component is set to GET and a corresponding segment index is incremented by one, and a component entry method in which a segment index is set to zero irrespective of a mode of the managed component, wherein the manager class defines a segment index method to query which of the JSP segments in the Web page is active at a time when a getter or setter method is invoked;

computer usable program code for assigning a different index to each of the JSP segments in the Web page;

computer usable program code for detecting invocation of a getter method of the managed component in the Web page; and, computer usable program code for responding to the detected invocation of the getter method by
using the segment index method to determine which of the JSP segments is active when the getter method is invoked,
identifying an index for the determined JSP segment,
getting a value for a property using the identified index,
incrementing the identified index,
repeating the identifying, incrementing, and getting steps for each of the JSP segments, and
then submitting the Web page.

10. The non-transitory computer usable storage memory device of claim 9, the computer usable program code further comprising:

computer usable program code for receiving the submitted Web page;

computer usable program code for setting a current index for a current JSP segment to a zero value;

computer usable program code for selecting one of the properties of the managed component corresponding to the current index;

setting a property value of the selected property;

computer usable program code for incrementing the current index; and, computer usable program code for repeating the selecting, setting the respective property value, and incrementing for each of the JSP segments.

11. The non-transitory computer usable storage memory device of claim 9, wherein the identified index is used to return respective values for multiple properties of the managed component.

12. The non-transitory computer usable storage memory device of claim 10, wherein the identified index is used to set respective values for multiple properties of the managed component.

* * * * *